United States Patent [19]

Hiraki et al.

[11] 3,865,977
[45] Feb. 11, 1975

[54] A SYSTEM FOR IDENTIFYING THE POSITION OF A STYLUS

[75] Inventors: Hisao Hiraki, Nishinomiya; Katsuhiko Miyagawa, Toyonaka, both of Japan

[73] Assignee: Matsushita Electric Industrial Co., Ltd., Osaka, Japan

[22] Filed: Apr. 23, 1973

[21] Appl. No.: 353,712

[52] U.S. Cl. .................................................. 178/19
[51] Int. Cl. ............................................. G08c 21/00
[58] Field of Search ...... 178/18, 19, 20; 340/166 R, 340/170, 146.3 SY, 347 AD; 323/126

[56] References Cited
UNITED STATES PATENTS

| | | | |
|---|---|---|---|
| 1,719,356 | 7/1929 | Benioff | 323/126 |
| 3,342,935 | 9/1967 | Leifer et al. | 178/19 |
| 3,647,963 | 3/1972 | Bailey | 178/19 |

*Primary Examiner*—Thomas A. Robinson
*Attorney, Agent, or Firm*—Stevens, Davis, Miller & Mosher

[57] ABSTRACT

A figure detecting system or system for identifying the position of a stylus is provided which comprises a two dimensional array of lattice electrodes, a pen movable over the lattice electrodes, two oscillators having frequencies which are different from each other, a plurality of phase shifters provided for each of the oscillators to shift the phase of the output thereof, and a plurality of impedance elements connected in series between the terminals of the plurality of phase shifters so that each terminal of the vertical and horizontal terminal groups of the lattice electrodes is connected to the associated junction point of the impedance elements of the phase shifters, whereby the positions of the pen over the lattice electrodes can be identified by reading out the phase-shifted electric signals at the respective positions of the pen over the lattice electrodes.

2 Claims, 19 Drawing Figures

FIG. 5

| | | | |
|---|---|---|---|
| $\Delta C_1$ | 32.9 | $\Delta C_{26}$ | 63.6 |
| $\Delta C_2$ | 34.9 | $\Delta C_{27}$ | 63.5 |
| $\Delta C_3$ | 36.9 | $\Delta C_{28}$ | 63.3 |
| $\Delta C_4$ | 38.8 | $\Delta C_{29}$ | 62.9 |
| $\Delta C_5$ | 40.5 | $\Delta C_{30}$ | 62.4 |
| $\Delta C_6$ | 42.8 | $\Delta C_{31}$ | 61.8 |
| $\Delta C_7$ | 44.3 | $\Delta C_{32}$ | 61.0 |
| $\Delta C_8$ | 46.2 | $\Delta C_{33}$ | 60.2 |
| $\Delta C_9$ | 47.9 | $\Delta C_{34}$ | 59.3 |
| $\Delta C_{10}$ | 49.8 | $\Delta C_{35}$ | 58.0 |
| $\Delta C_{11}$ | 51.4 | $\Delta C_{36}$ | 57.2 |
| $\Delta C_{12}$ | 52.9 | $\Delta C_{37}$ | 55.6 |
| $\Delta C_{13}$ | 54.3 | $\Delta C_{38}$ | 54.3 |
| $\Delta C_{14}$ | 55.6 | $\Delta C_{39}$ | 52.9 |
| $\Delta C_{15}$ | 57.2 | $\Delta C_{40}$ | 51.4 |
| $\Delta C_{16}$ | 58.0 | $\Delta C_{41}$ | 49.8 |
| $\Delta C_{17}$ | 59.3 | $\Delta C_{42}$ | 47.9 |
| $\Delta C_{18}$ | 60.2 | $\Delta C_{43}$ | 46.2 |
| $\Delta C_{19}$ | 61.0 | $\Delta C_{44}$ | 44.3 |
| $\Delta C_{20}$ | 61.8 | $\Delta C_{45}$ | 42.8 |
| $\Delta C_{21}$ | 62.4 | $\Delta C_{46}$ | 40.5 |
| $\Delta C_{22}$ | 62.9 | $\Delta C_{47}$ | 38.8 |
| $\Delta C_{23}$ | 63.3 | $\Delta C_{48}$ | 36.9 |
| $\Delta C_{24}$ | 63.5 | $\Delta C_{49}$ | 34.9 |
| $\Delta C_{25}$ | 63.6 | $\Delta C_{50}$ | 32.9 |

(In FARADS)

FIG. 8
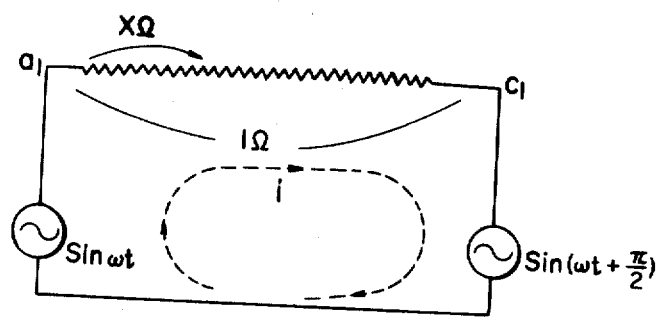
FIG. 9  $\rho = \text{Tan}^{-1}\dfrac{X}{1-X}$
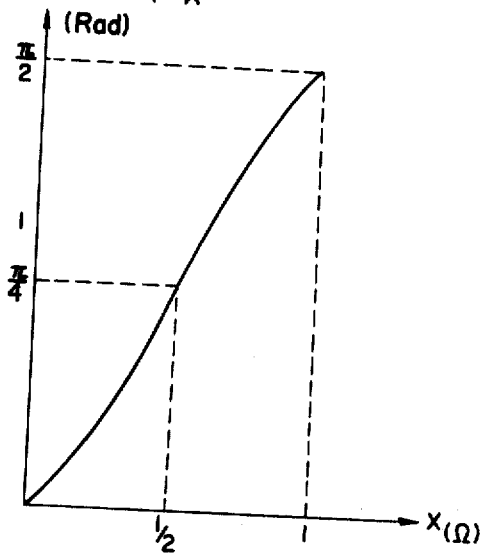

FIG. 11

| | | | |
|---|---|---|---|
| $\Delta X_1$ | 0.030 | $\Delta X_{26}$ | 0.016 |
| $\Delta X_2$ | 0.030 | $\Delta X_{27}$ | 0.016 |
| $\Delta X_3$ | 0.026 | $\Delta X_{28}$ | 0.016 |
| $\Delta X_4$ | 0.026 | $\Delta X_{29}$ | 0.016 |
| $\Delta X_5$ | 0.024 | $\Delta X_{30}$ | 0.016 |
| $\Delta X_6$ | 0.024 | $\Delta X_{31}$ | 0.016 |
| $\Delta X_7$ | 0.022 | $\Delta X_{32}$ | 0.016 |
| $\Delta X_8$ | 0.021 | $\Delta X_{33}$ | 0.016 |
| $\Delta X_9$ | 0.021 | $\Delta X_{34}$ | 0.017 |
| $\Delta X_{10}$ | 0.021 | $\Delta X_{35}$ | 0.017 |
| $\Delta X_{11}$ | 0.021 | $\Delta X_{36}$ | 0.018 |
| $\Delta X_{12}$ | 0.018 | $\Delta X_{37}$ | 0.018 |
| $\Delta X_{13}$ | 0.018 | $\Delta X_{38}$ | 0.018 |
| $\Delta X_{14}$ | 0.018 | $\Delta X_{39}$ | 0.018 |
| $\Delta X_{15}$ | 0.018 | $\Delta X_{40}$ | 0.021 |
| $\Delta X_{16}$ | 0.017 | $\Delta X_{41}$ | 0.021 |
| $\Delta X_{17}$ | 0.017 | $\Delta X_{42}$ | 0.021 |
| $\Delta X_{18}$ | 0.016 | $\Delta X_{43}$ | 0.021 |
| $\Delta X_{19}$ | 0.016 | $\Delta X_{44}$ | 0.022 |
| $\Delta X_{20}$ | 0.016 | $\Delta X_{45}$ | 0.024 |
| $\Delta X_{21}$ | 0.016 | $\Delta X_{46}$ | 0.024 |
| $\Delta X_{22}$ | 0.016 | $\Delta X_{47}$ | 0.026 |
| $\Delta X_{23}$ | 0.016 | $\Delta X_{48}$ | 0.026 |
| $\Delta X_{24}$ | 0.016 | $\Delta X_{49}$ | 0.030 |
| $\Delta X_{25}$ | 0.016 | $\Delta X_{50}$ | 0.030 |

A SYSTEM FOR IDENTIFYING THE POSITION OF A STYLUS

The present invention relates to improvements in and relating to figure detecting systems or systems for identifying the position of a stylus constituting the transmission writing sections of known remote hand writing device used with a telephone apparatus.

Generally, in order to convert a figure to be transmitted into electric signals while the figure is being written by a stylus or pen (i.e., in real time), the position of the pen from moment to moment must be successively converted into electric signals. Prior art systems of this type include, for example, one which utilizes a cathode ray tube and a light pen, and another mechanical system which utilizes a pantograph mechanism for obtaining a figure similar to the one being written. However, such prior art systems have been unsatisfactory, since they have been either complicated in construction and expensive to manufacture or inadequate in terms of their response speed and reliability in operation.

It is therefore the principal object of the present invention to provide a written figure detecting system which meets these requirements and which is simple and economical.

According to the present invention, a written figure detecting system or system for identifying the position of a stylus or pen is provided which includes no mechanical moving parts, is simple in construction and is capable of easily converting the coordinates of the position of a pen over a plane surface into electric signals from moment to moment. Further, the written figure detecting plate used in this invention comprises only impedance elements and phase shifters and therefore a system which is easy for manufacturing, extraordinarily inexpensive and highly reliable in operation can be provided.

Other objects and features of this invention will become readily apparent from the following detailed description when read in conjunction with the accompanying drawing, in which:

FIG. 5 illustrates an example of the capacitance values calculated for the written figure detecting plate of FIG. 2;

FIGS. 8 and 9 are diagrams useful for explaining the principle of the written figure detecting plate shown in FIG. 7;

FIG. 11 illustrates an example of the resistance values calculated for the written figure detecting plate of FIG. 7;

The preferred embodiments of the present invention will now be explained with reference to the accompanying drawings.

Figure 1:
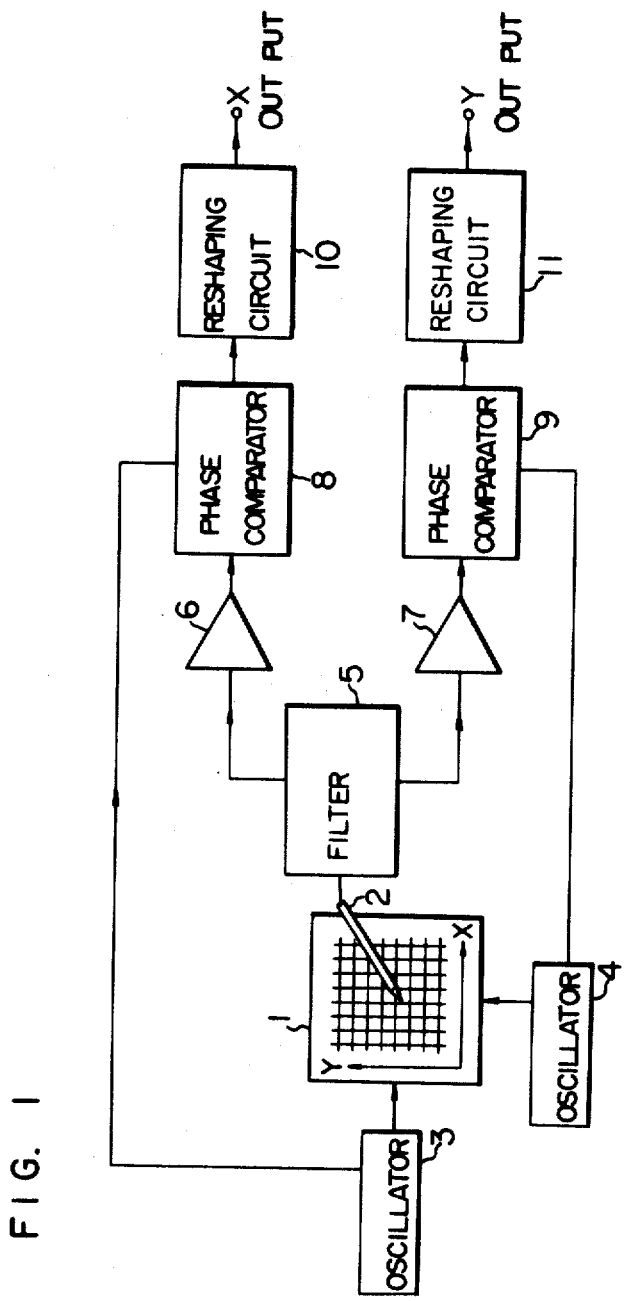
FIG. 1 is a functional system diagram showing a written figure detecting system according to an embodiment of the present invention.

Referring first to FIG. 1 illustrating in block form a functional system diagram of an embodiment of the invention, numeral 1 designates a planar written figure detecting plate on which is placed a recording paper, film or the like to write down figures, characters or the like by using a writing pen 2. Numerals 3 and 4 designate oscillators for respectively applying signals of different frequencies in X and Y directions of the written figure detecting plate 1 so that the phase of the applied signals changes as they propagate in the X or Y direction. It is arranged so that the amount of change of phase is proportional to the distance in the X or Y direction over the written figure detecting plate. The writing pen 2 is provided with a pen point having a function to pick up the X, Y signals of a point on the surface of the written figure detecting plate 1 where it is in contact therewith, whereby the phase differences between the signals picked up by the pen point and the signals generated by the oscillators 3 and 4 are compared to thereby convert the coordinates of the position of the pen point over the written figure detecting plate 1 into electric signals.

Numeral 5 designates a filter for separating the signals picked up by the pen point into the X and Y signals, and numerals 6 and 7 designate amplifiers. Numerals 8 and 9 designate phase comparison circuits for detecting the amount of change of phase of the X and Y signals, respectively, and numerals 10 and 11 designate reshaping circuits.

Figure 2:
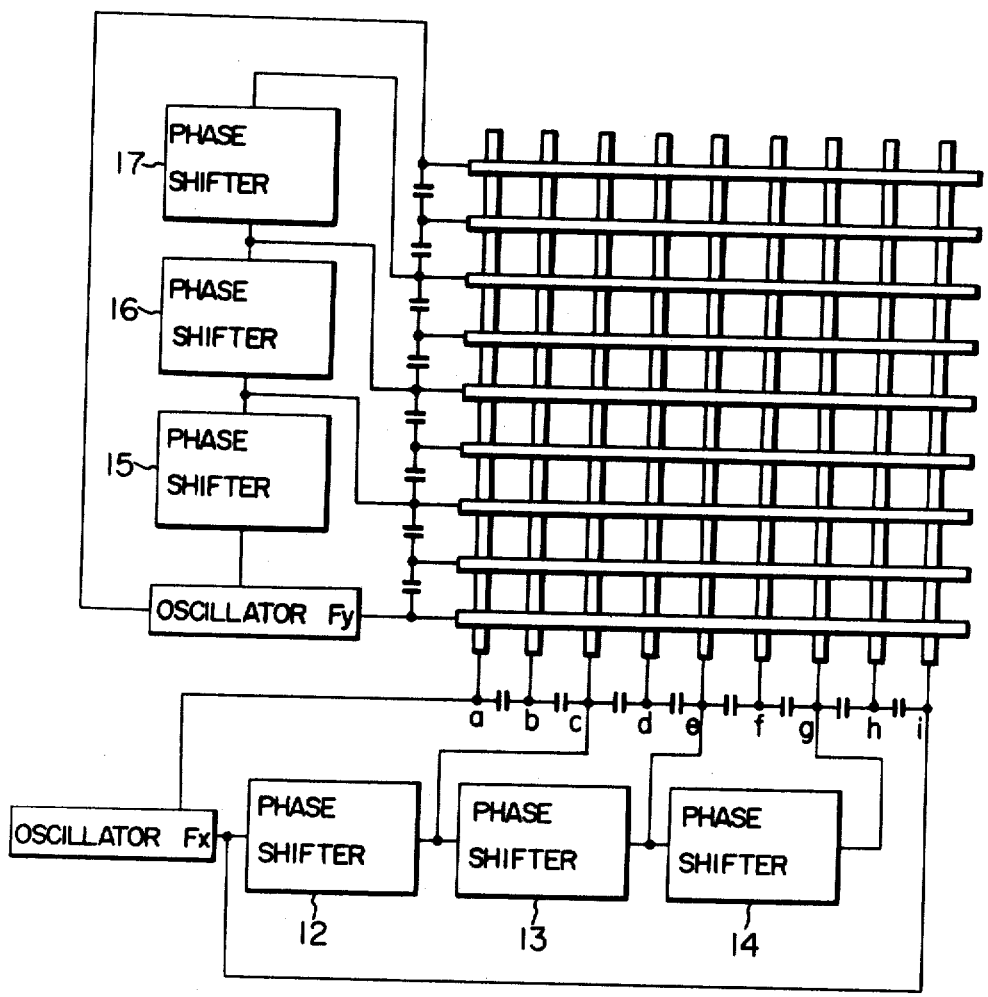
FIG. 2 is an equivalent circuit for the written figure detecting plate constituting a component part of the embodiment shown in FIG. 1.

FIG. 2 illustrates an electrical equivalent circuit for the written figure detecting plate 1 comprising a plurality of capacitors and phase shifters so that the equally fixed phase shifts are provided at the terminal portions of a large number of mutually insulated lattice electrodes. Numerals 12 through 17 designate phase shifters each thereof providing a phase shift of 90°, whereby a phase shift of 90° is obtained at a point $c$ with respect to a point $a$, hence a phase shift of 180° at a point $e$ and a phase shift of 270° at a point $g$ with respect to the point $a$. Thus, if suitable capacitors for dividing into parts are provided between the points $a$ and $c$, the points $c$ and $e$, the points $e$ and $g$ and the points $g$ and $i$, signals whose phases are shifted by an equal number of degrees can be applied to the respective lattice electrodes.

Figure 3:
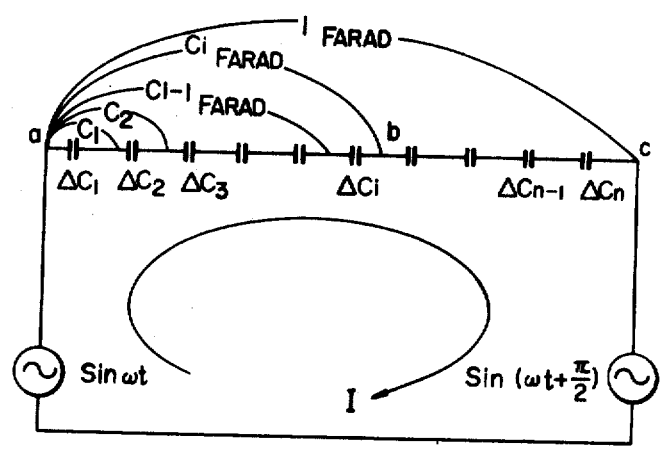
FIGS. 3 and 4 are diagrams useful for explaining the principle of the written figure detecting plate shown in FIG. 2.

The principle of this written figure detecting plate 1 will now be explained with reference to FIGS. 3 and 4. In FIG. 3, the voltages of two sources of signals shifted in phase with respect to each other by 90° are given as $\sin \omega t$ and $\sin (\omega t + [\pi/2])$, respectively, and they are applied between the points $a$ and $c$ comprising $n$ capacitors ($\Delta C_1, \Delta C_2, \ldots, \Delta C_i, \ldots,$ and $\Delta C_n$) having a total capacitance value of 1 farad. If the voltage at the point $b$ apart from the point $a$ by $C_i$ farad (there are $i$ capacitors between the points $a$ and $b$) is given as $f(C_i)$ and the current that flows between the points $a$ and $c$ is given as $I$, then we obtain $$I = j\omega\{\sin \omega t - \sin(\omega t + [\pi/2])\}$$
$$= j\omega \sqrt{2} \sin(\omega t = [\pi/4])$$

(A)

$$\therefore f(C_i) = \sin \omega t - j\omega \sqrt{2} \sin(\omega t - [\pi/4])(1/j\omega C_i)$$
$$= \sqrt{(1 - [1/C_i])^2 + (1/C_i^2)} \sin(\omega t + \phi)$$

(B)

where $$\phi = \tan^{-1}[1/(C_i - 1)]$$

(C)

Figure 4:
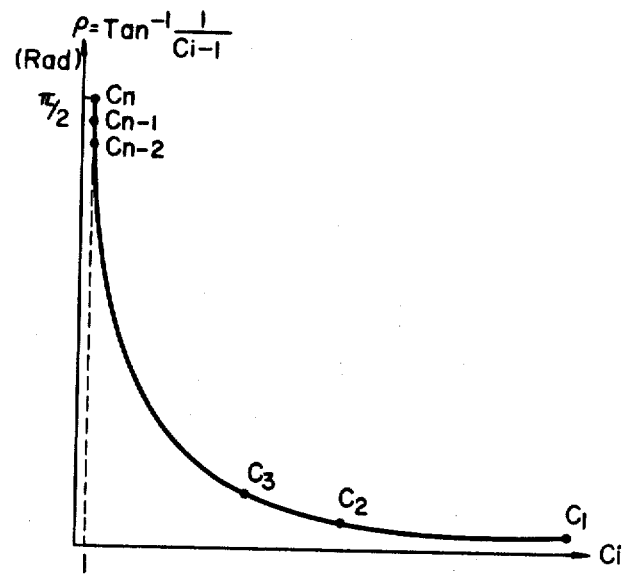

FIG. 4 illustrates a graph for $\phi = \tan^{-1}[1/(C_i - 1)]$. Consequently, a desired phase shift can be obtained by selecting the value of $C_i$ to divide the $\pi/2$ into $n$ equal parts according to FIG. 4 and calculating $\Delta C_i$ from an equation $$\Delta C_i = (C_{i-1} \cdot C_i)/(C_{i-1} - C_i)$$

(D)

For instance, FIG. 5 shows the values of the respective capacitance values when the 0 to $\pi/2$ is divided into 50 equal parts (i..e., $n = 50$). While, in this embodiment, the combined series capacitance for the 0 to $\pi/2$ is selected 1 farad any desired value may of course be selected. Further, while the amplitude of the voltage $f(C_i)$ drops by 0.7 times the applied voltage or drops by 3 dB at the minimum value of $C_i = 2$ as will be seen from the equation (B), the experiments have shown that this would give rise to no inconvenience in picking up and processing the signals.

Figure 6:
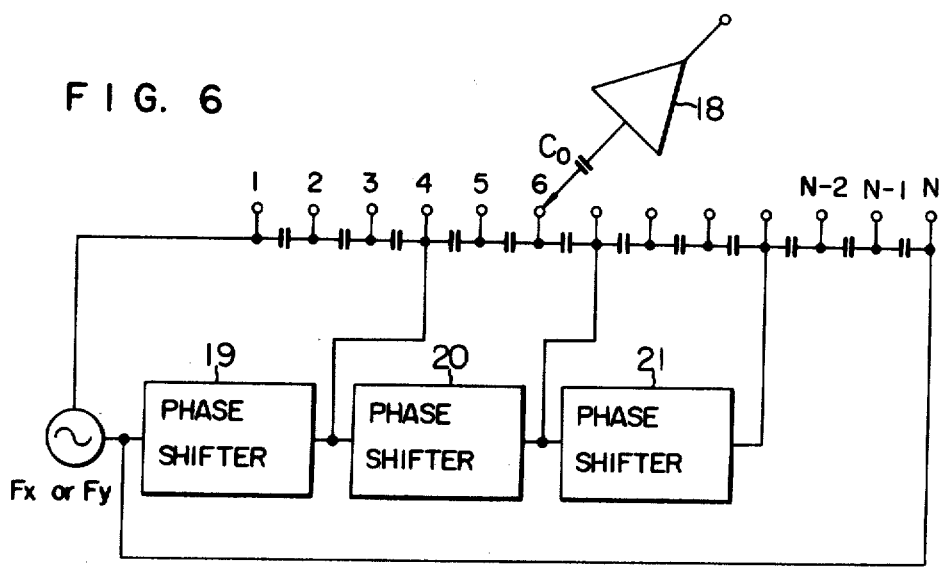
FIG. 6 is an equivalent circuit showing the electrical functions of the written figure detecting plate of FIG. 2 and the pen.

FIG. 6 is an equivalent circuit showing the electrical functions of the written figure detecting plate 1 and the pen 2. In FIG. 6, numeral 18 designates a preamplifier for the high impedance in the pen holder, 1, 2, 3, $\ldots$, and N designate the lattice electrodes in the X or Y direction, and $C_o$ designates a capacitance provided by the insulating layer on the surface of the written figure detecting plate and the recording paper located between the pen point and the lattice electrodes. Namely, the pen picks up signals from the lattice electrodes through this capacitance $C_0$. Numerals 19, 20, and 21 designate phase shifters which provide respectively a phase shift of 90° in the same manner as the phase shifters 12, 13 and 14 or 15, 16 and 17 shown in FIG. 2. It will thus be seen that the phase difference between the signal picked up by the pen and the signal applied to the detecting plate changes in accordance with the position of the pen.

While, in the embodiment of this invention so far described, capacitors are employed as the impedance elements, resistors or inductors may be employed in place of the capacitors to obtain the same effect as if they serve as the impedance elements. Another embodiment of this invention employing resistors as the impedance elements will be explained with reference to FIGS. 7 through 11.

Figure 7:
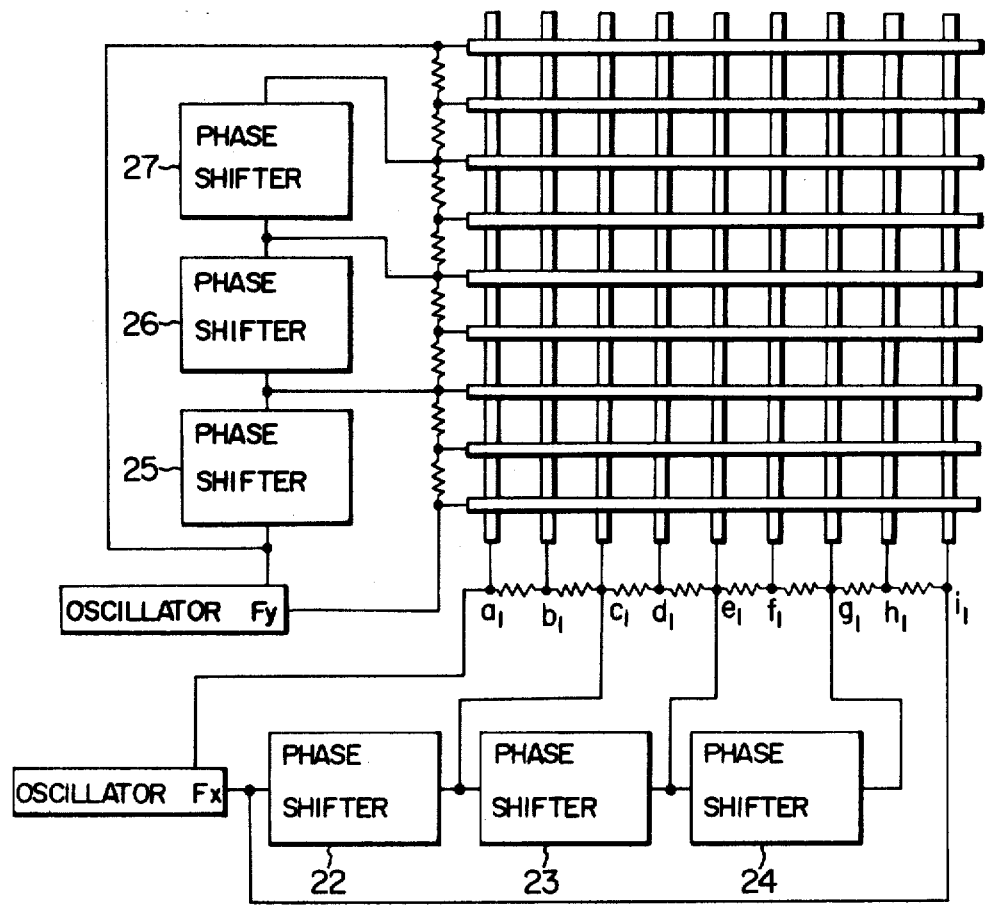
FIG. 7 is an equivalent circuit for the written figure detecting plate employed in another embodiment of the present invention.

In FIG. 7, numerals 22 through 27 designate phase shifters which provide respectively a phase shift 0f 90° so that with respect to a point $a_1$, the phase is shifted 90° at a point $c_1$, 180° at a point $e_1$ and 270° at a point $g_1$. Thus, if suitable resistors for dividing into parts are provided between the points $a_1$ and $c_1$, the points $c_1$ and $e_1$, the points $e_1$ and $g_1$ and the points $g_1$ and $i_1$, respectively, signals whose phases are shifted by an equal number of degrees can be applied to the respective lattice electrodes. This fact will be explained with reference to FIGS. 8 and 9. In FIG. 8, the voltages of two sources of signals shifted in phase with respect to each other by 90° are given as $\sin \omega t$ and $\sin(\omega t + [\pi/2])$, respectively, and they are applied between the points $a_1$ and $c_1$ having a resistance value of 1 ohm. If the voltage at a point X ohms apart from the point $a_1$ is given as $f(X)$ and the current that flows between the points $a_1$ and $c_1$ is given as $i$, then we obtain $$i = \frac{\sin \omega t - \sin\left(\omega t + \frac{\pi}{2}\right)}{1} = \sqrt{2} \sin\left(\omega t - \frac{\pi}{4}\right)$$

(A)

$$f(X) = \sin \omega t - iX = \sqrt{(1-X)^2 + X^2} \cdot \sin(\omega t + \phi)$$

(B)

where $$\phi = \tan^{-1}[X/(1-X)]$$

(C)

FIG. 9 is a graphical representation of $\phi = \tan^{-1}[X/(1-X)]$. Accordingly, by selecting the value of X to divide the $\pi/2$ into equal parts in accordance with FIG. 9, a desired phase shift can be obtained. For instance, FIG. 11 shows the values of the respective X$i$ when the entirety is divided into 200 equal parts, i.e., when between 0° and 90° is divided into 50 equal parts and the resistance value between the adjacent equally divided points is given $\Delta X i$. While, in FIG. 8, the resistance value between 0° and 90° is selected as 1 ohm, any other given value may of course be selected. Further, though the amplitude of the voltage $f(X)$ drops by 0.7 times the applied voltage, i.e., by 3 $d$B at the minimum value of X $= 0.5$ as will be seen from the equation (B), the experiments have shown that this could give rise to no inconvenience in picking up and processing the signals.

Figure 10:
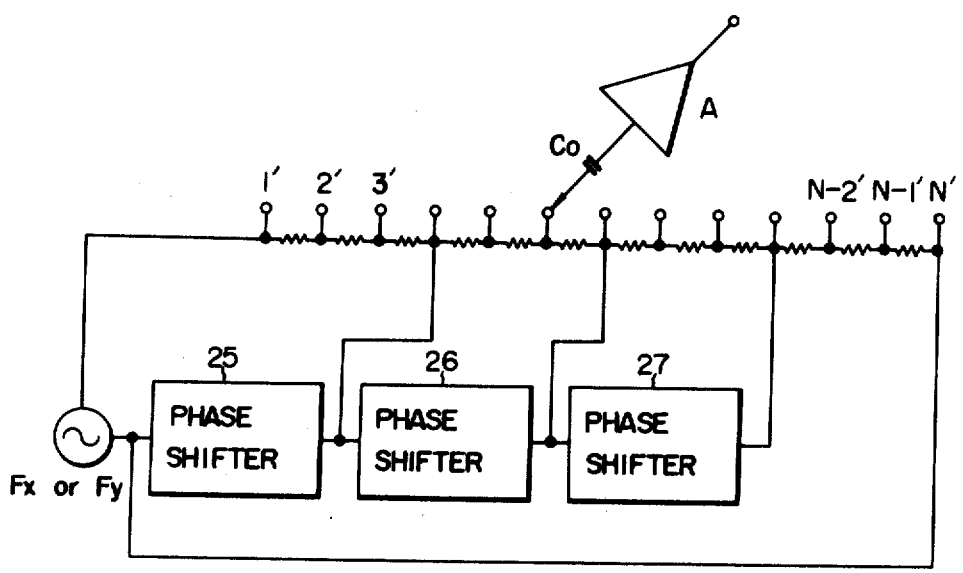
FIG. 10 is an equivalent circuit showing the electrical functions of the written figure detecting plate of FIG. 7 and the pen.

FIG. 10 illustrates an equivalent circuit showing the electrical functions of the written figure detecting plate of FIG. 7 and the pen. In FIG. 10, symbol A designates a preamplifier for the high input impedance in the pen holder, 1', 2', 3', $\ldots$, and N' lattice electrodes in the X or Y direction, and $C_0$ a capacitance provided by the insulating layer on the surface of the written figure detecting plate and the recording paper located between the pen point and the lattice electrodes. Namely, the pen picks up the signals from the lattice electrodes through the capacitance $C_0$. Numerals 25 through 27 designate phase shifters which provide respectively a phase shift of 90° in the same manner as the phase shifters 12 to 14 or 15 to 17 shown in FIG. 2. It will thus be seen that the phase difference between the signals picked up by the pen and the signals applied to the detecting plate changes in accordance with the position of the pen.

Figure 12:
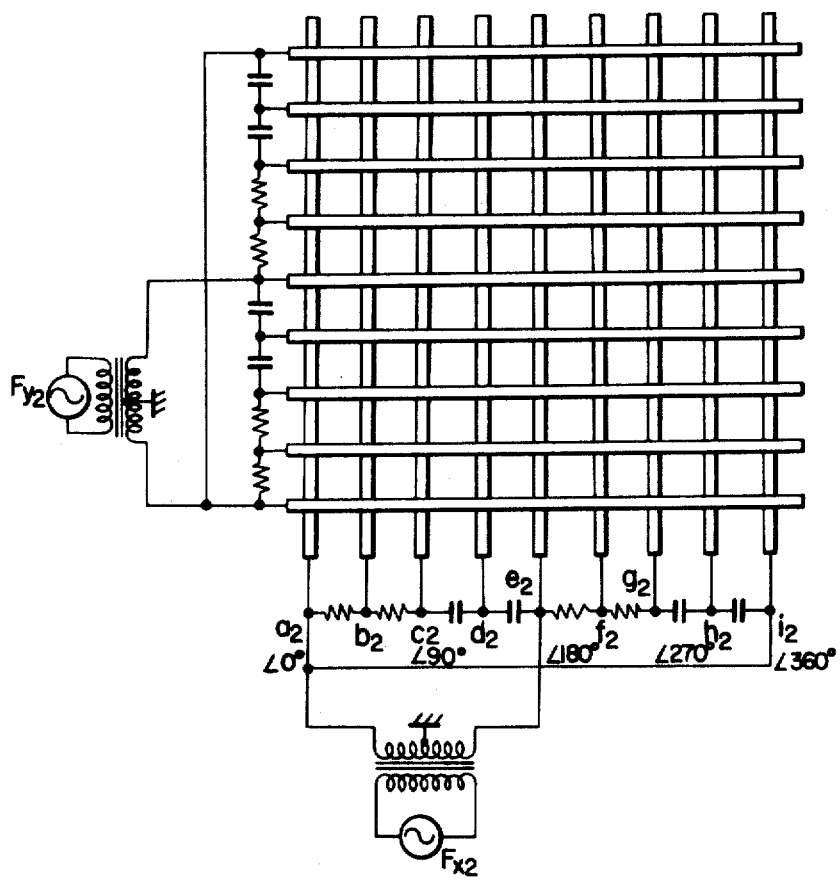
FIG. 12 is an equivalent circuit for the written figure detecting plate employed in still another embodiment of the present invention.
Figure 13:
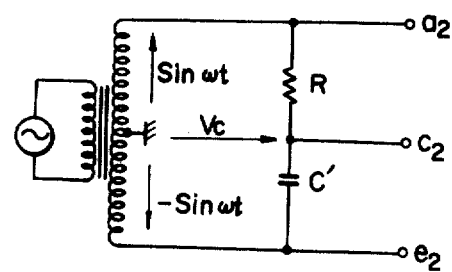
FIGS. 13 to 17 are diagrams useful for explaining the principle of the written figure detecting plate shown in FIG. 12.

FIG. 12 illustrates an electrical equivalent circuit for the written figure detecting plate employed in still another embodiment of the present invention and it comprises a plurality of resistors, capacitors and transformers so that the equally fixed phase shifts are provided at the respective terminal portions of a large number of mutually insulated lattice electrodes. The center point of the transformer is grounded so that the phase at a point $a_2$ (and $i_2$) is shifted 90° with respect to the ground, while the phase at a point $e_2$ is shifted 90° with respect to the ground in opposition to the point $a_2$. Namely, the point $e_2$ is shifted in phase with respect to the point $a_2$ by 180°. Further, by suitably selecting the value R of the resistors between the points $a_2$ and $c_2$ and the value $C'$ of the capacitors between the points $c_2$ and $e_2$, the point $c_2$ can be shifted in phase with respect to the point $a_2$ by 90°. This fact will now be explained with reference to FIG. 13.

If the voltage at the point $a_2$ is represented by $\sin \omega t$, then the voltage at the point $e_2$ is given by $\sin(\omega t + \pi) = -\sin \omega t$. Consequently, if $V_c$ represents the potential at the point $c_2$, then we obtain $$V_c = [1/(j\omega C')] \cdot (2 \sin\omega t)/[R+(1/j\omega C')] -\sin\omega t$$

$$[(1 - j\omega C'R)/(1 + j\omega C'R)] \cdot \sin\omega t$$

$$\therefore V_c = \epsilon^{-j \cdot 2\theta} \cdot \sin\omega t \quad (A)$$

where $$\theta = \tan^{-1} \omega C'R \quad (B)$$

Therefore, by selecting the values of $\omega$, $C'$ and R to give $$\omega C'R = 1 \quad (C)''$$

then $\theta = \pi/4$ and $V_c = \epsilon^{-j\pi/2}$. In other words, the point $c_2$ is shifted in phase with respect to the point $a_2$ by 90°. Similarly, by selecting the resistance value R between the points $e_2$ and $g_2$ and the capacitance value $C'$ between the points $g_2$ and $i_2$ so that $\omega C'R = 1$, the point $g_2$ can be shifted in phase with respect to the point $e_2$ by 90°. In other words, the point $g_2$ can be shifted in phase with respect to the point $a_2$ by 270°.

Further, by providing suitable resistors between the points $a_2$ and $c_2$ and the points $e_2$ and $g_2$ to divide into parts and by providing suitable capacitors between the points $c_2$ and $e_2$ and the points $g_2$ and $i_2$ to divide into parts, signals whose phases are shifted by an equal number of degrees can be applied to the lattice electrodes. This fact will be explained hereunder.

Figure 14:
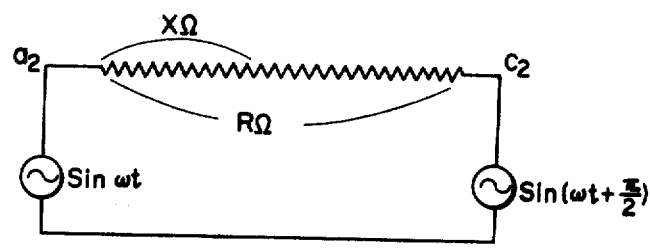

Referring to FIG. 14, the division with resistors will be explained first. The voltages of two sources of signals shifted in phase from each other by 90° are given by $\sin \omega t$ and $\sin(\omega t + [\pi/2])$, respectively, and they are applied between the points $a_2$ and $c_2$ having the resistance value R. If the voltage at a point apart from the point $a_2$ by X ohms is given as $f(x)$ and the current that flows between the points $a_2$ and $c_2$ is given as $i$, then we obtain $$i = \frac{\sin \omega t - \sin\left(\omega t + \frac{\pi}{2}\right)}{R}$$

$$= \frac{\sqrt{2}}{R} \sin\left(\omega t - \frac{\pi}{4}\right) \quad (D)$$

$$\therefore f(X) = \sin\omega t - i \cdot X = \sqrt{(1 - [X/R])^2 + (X/R)^2} \sin(\omega T + \phi) \quad (E)$$

where $$\phi = \tan^{-1}(X/R)/[1 - (X/R)] \quad (F)$$

Figure 15:
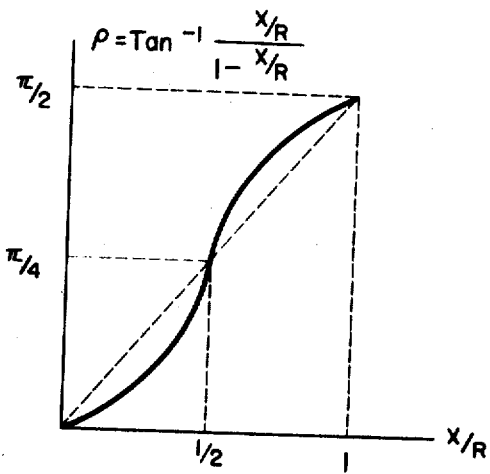

FIG. 15 is a graphical representation of $\phi = \tan^{-1}(X/R)/[1-(X/R)]$. Thus, by selecting the values of X in accordance with FIG. 15 so that the $\pi/2$ is divided into equal parts, a desired phase shift can be obtained. The dividing resistors can also be provided between the points $e_2$ and $g_2$ in the same manner as between the points $a_2$ and $c_2$.

Figure 16:
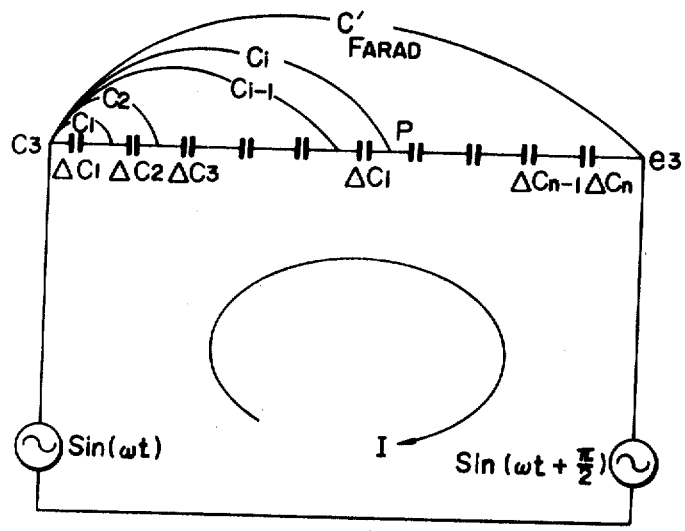

Next, the division with capacitors will be explained with reference to FIGS. 16 and 17. The voltages of two sources of signals shifted in phase from each other are given as $\sin \omega t$ and $\sin(\omega t + [\pi/2])$, respectively, and they are applied between the points $c_3$ and $e_3$ comprising $n$ capacitors having a total capacitance value of $C'$ farad. If the voltage at a point P apart from the point $c_3$ by $C_i$ farad (there are $i$ capacitors between the points $c_3$ and P) is given as $V_i(C_i)$ and the current that flows between the points $c_3$ and $e_3$ is given as I, then we obtain $$I = j\omega C'\{\sin\omega t - \sin(\omega t + [\pi/2])\}$$

$$= j\omega C' \sqrt{2} \sin(\omega t - [\pi/4]) \quad (G)$$

$$\therefore V_i(C_i) = \sin\omega t - j\omega C' \sqrt{2} \sin(\omega t - [\pi/4])(1/j\omega C_i)$$

$$= \sqrt{(1 - [C'/C_i])^2 + (C'/C_i)^2} \sin(\omega t + \phi) \quad (H)$$

where $$\phi = \tan^{-1}[1/(C_i/C'-1)] \quad (J)$$

Figure 17:
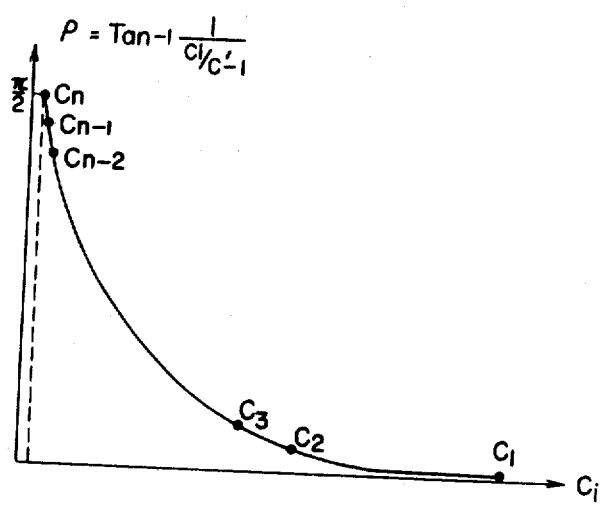

FIG. 17 is a graphical representation of $\phi = \tan^{-1}[1/(C_i/C'-1)]$. Consequently, if the value of $C_i$ is selected in accordance with FIG. 17 so that the $\pi/2$ is divided into $n$ equal parts and if the value of $\Delta C_i$ is calculated from an equation $$\Delta C_i = (C_i - 1 \cdot C_i)/(C_{i-1} - C_i) \quad (H).$$

then a desired phase shift can be obtained. The division by capacitors between the points $g_2$ and $i_2$ can also be effected in the same manner.

In this case, while both of the voltages $f(X)$ and $g(C_i)$ drop at the minimum value by 3 dB as compared with the applied voltage $\sin\omega t$, the experiments have shown that this would give rise to no inconvenience in picking up and processing the signals. In this way, signals whose phases are shifted by an equal number of degrees can be applied to the respective electrodes.

Figure 18:
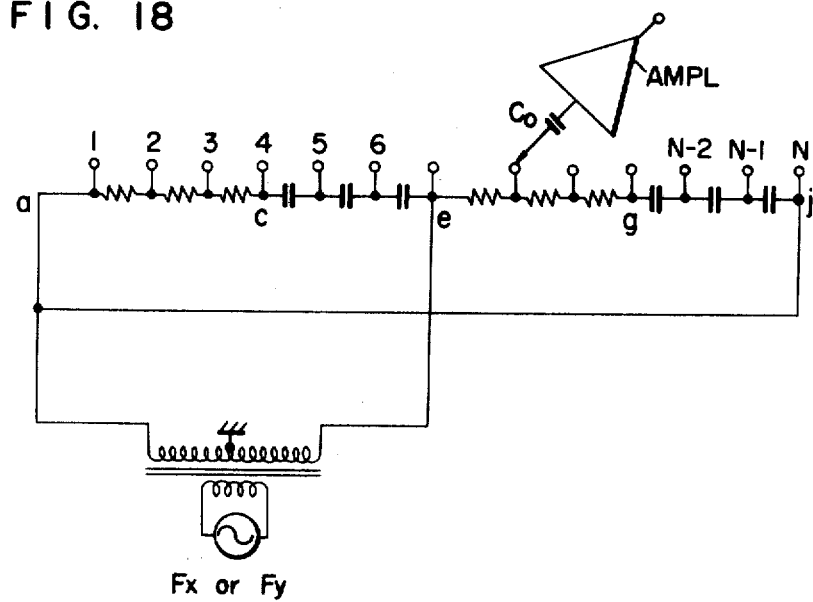
FIG. 18 is an equivalent circuit showing the electrical functions of the written figure detecting plate of FIG. 12 and the pen.

FIG. 18 illustrates an equivalent circuit showing the electrical functions of the written figure detecting plate of FIG. 12 and the pen. In FIG. 18, symbol AMPL. designates a preamplifier for the high input impedance in the pen holder. Numerals 1, 2, 3, . . . , and N designate the lattice electrodes in the X or Y direction and symbol $C_o$ designates a capacitance provided by the insulating layer on the surface of the detecting plate and the recording paper located between the pen point and the lattice electrodes. Namely, the pen picks up the signals from the lattice electrodes through the capacitance $C_o$. It will thus be seen that the phase difference between the signals picked up by the pen and the signals applied to the detecting plate changes in accordance with the position of the pen.

Figure 19:
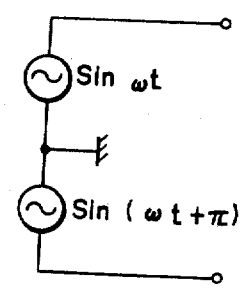
FIG. 19 is a modification of the power supply for the written figure detecting plate of FIG. 12.

While, in the embodiment described above, the signal sources are provided by the transformers which are out of phase by 180°, the same phase shifts as provided with the transformers can also be obtained with a circuit shown in FIG. 19 which provides signal sources that are different in phase by 180°.

What we claim is:

1. A system for identifying the position of a pen comprising a two dimensional array having vertical and horizontal terminal groups of lattice electrodes, a pen movable over said lattice electrodes, two oscillators having frequencies different from each other, a plurality of phase shifters provided for each of said oscillators to shift the phase of the output thereof, and a plurality of impedance elements connected in series across the terminals of each of said plurality of phase shifters so that each terminal of the vertical and horizontal terminal groups of said lattice electrodes is connected to the associated one of the junction points of said impedance elements of said phase shifters, said plurality of impedance elements including a series circuit of resistors and capacitors, whereby said phase-shifted signals are read out at each position of said pen over said lattice electrodes to thereby identify the position of said pen.

2. A system for identifying the position of a pen comprising a two dimensional array having vertical and horizontal terminal groups of lattice electrodes, a pen movable over said lattice electrodes, two oscillators having frequencies different from each other, a plurality of phase shifters provided for each of said oscillators to shift the phase of the output thereof, a plurality of impedance elements connected in series across the terminals of each of said plurality of phase shifters so that each terminal of the vertical and horizontal terminal groups of said lattice electrodes is connected to the associated one of the junction points of said impedance elements of said phase shifters, and two power sources coupled to said oscillators, which sources are different in phase by 180° and each frequency of which is peculiar to each of the vertical and horizontal terminal groups of the two dimensional array of lattice electrodes, so that each of said power sources is connected to a terminal in one of said two terminal groups, said plurality of impedance elements including a plurality of resistors and reactance elements connected in series across both ends of each of said power sources and having junction points between the resistors, between said reactance elements and between a resistor and a reactance element, with each of the junction points between said resistors, between said reactance elements, and between a resistor and reactance element connected to the associated one of said lattice electrodes, whereby the pen is moved over said lattice electrodes to detect the phase of a voltage of each frequency at each point over said lattice electrodes to thereby identify the position of said pen.

3. A system for identifying the position of a pen comprising a two dimensional array having vertical and horizontal terminal groups of lattice electrodes, a pen movable over said lattice electrodes, two oscillators having frequencies different from each other, a plurality of phase shifters provided for each of said oscillators to shift the phase of the output thereof, and a plurality of impedance elements connected in series across the terminals of each of said plurality of phase shifters so that each terminal of the vertical and horizontal terminal groups of said lattice electrodes is connected to the associated one of the junction points of said impedance elements of said phase shifters, said plurality of impedance elements including a series circuit of at least resistors, whereby said phase-shifted signals are read out at each position of said pen over said lattice electrodes to thereby identify the position of said pen.

* * * * *